March 12, 1957
J. R. HUBER
2,784,938
CARGO TIE DOWN DEVICE HAVING QUICK
RELEASE CHAIN ENGAGEABLE MECHANISM
Filed Oct. 15, 1951
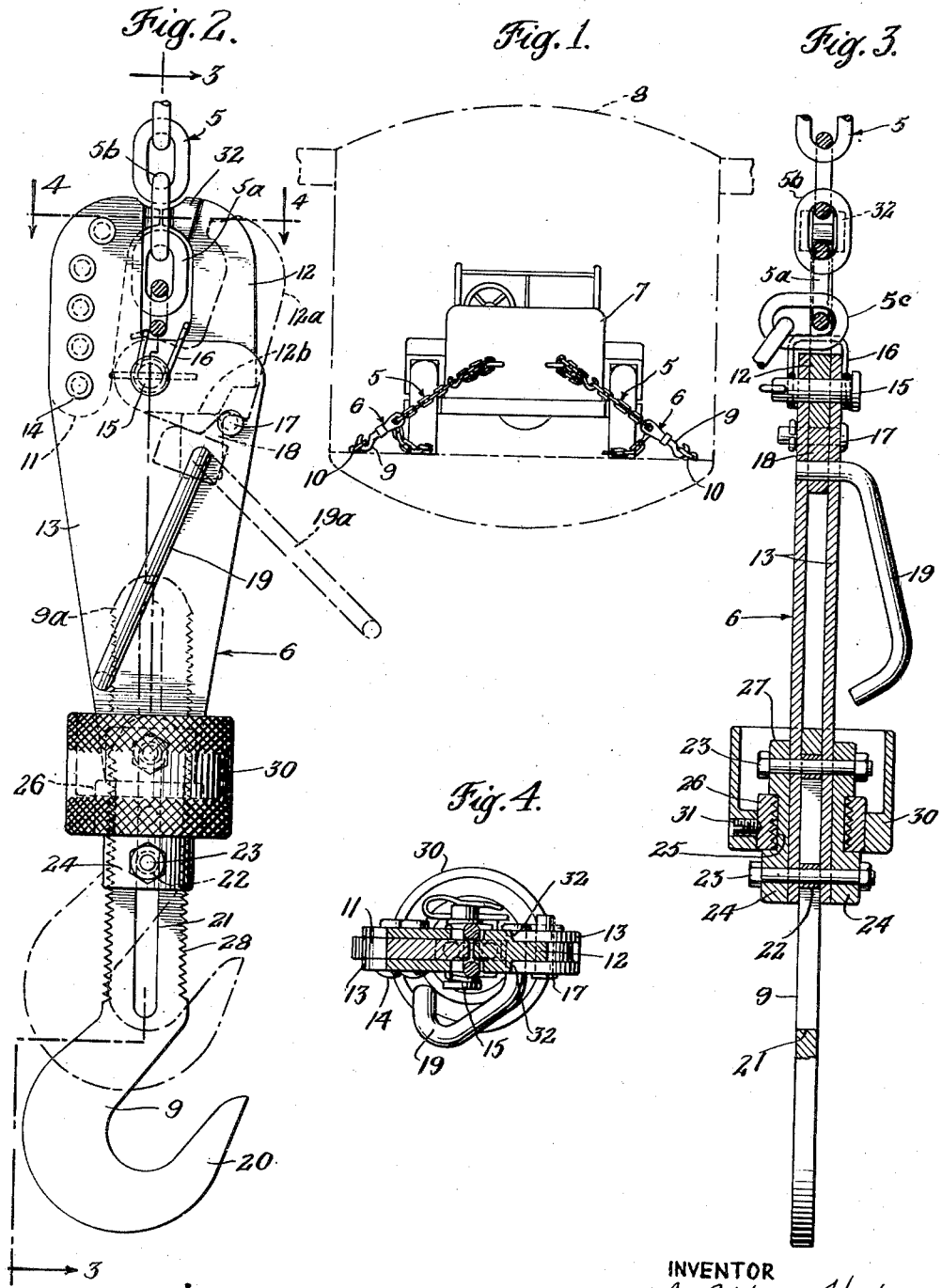
INVENTOR
J. Richard Huber
BY
Harris S. Campbell
ATTORNEY

United States Patent Office 2,784,938
Patented Mar. 12, 1957

2,784,938

CARGO TIE DOWN DEVICE HAVING QUICK RELEASE CHAIN ENGAGEABLE MECHANISM

John Richard Huber, Warrington, Pa., assignor to Eastern Rotorcraft Corporation, Neshaminy, Pa., a corporation of Pennsylvania Application October 15, 1951, Serial No. 251,333

3 Claims. (Cl. 254—67)

This invention relates to apparatus suitable for such purposes as tying down cargo during transit and is particularly directed to apparatus which incorporates a chain tension member with a special tightening device adapted to engage the chain member.

In apparatus of the general type to which the present invention is directed, the tension member can take various forms. A cable type tension member is often used but this has the draw-back that strands of the cable may fray and break, making it difficult to handle. A chain tension member has the advantage that it is not only extremely flexible in nature but may be stored more conveniently than cable. In instances where only a portion of the chain member is used, the remaining chain folds up into a compact pile on the floor where it is out of the way.

One of the main objects of the present invention is the provision of simplified connecting apparatus for attaching a chain member of a tie down device to an anchor point.

A further object is to provide a compact tightening and adjusting mechanism associated with the chain engaging device.

Another object of the invention is the provision of a simple chain engaging hook assembly which is arranged to provide for quick release action even when under tension load.

Another object is the provision of a chain engaging and release mechanism which is combined with the quick release mechanism of the device.

How these and other objects of the present invention are accomplished will be clear from the following description of the drawings, in which—

Figure 1 illustrates a typical application of the device of the present invention as used to tie down cargo in an aircraft.

Figure 2 is a side view of the tie down device.

Figure 3 is a longitudinal sectional view taken in the direction of arrows 3—3, Figure 2.

Figure 4 is a view partly in section, taken in the direction of arrows 4—4, Figure 2.

In Figure 1 it will be seen that tie down apparatus consisting of chain member 5 and anchor device 6 is used to secure cargo, for example the vehicle 7, in a transport aircraft, the fuselage of which is indicated by chain dotted outline 8. The chain member 5 may be secured to any suitable connecting point on the vehicle while the anchor hook 9 of the device 6 may be connected to a ring 10 attached to the aircraft. By properly locating the tie down units with respect to the load being secured, it is possible to restrain the load from movement in all directions with a minimum number of tie down units. In the example illustrated the vehicle 7 is prevented from appreciable movement either vertically or horizontally by use of four tie down devices properly angled and tightened.

The tie down unit consists of a length of linked chain 5 and a chain engaging and tightening device illustrated generally by the numeral 6, the details of the construction being clearly shown in Figures 2, 3, and 4. The chain engaging unit is attached to any link of the chain 5 which is engaged by jaws 11 and 12. Jaw 11 is mounted rigidly in the frame composed of two plates 13, rivets 14 being used to attach the fixed jaw 11. Jaw 12 is pivotally mounted by means of pin 15 between the plates 13 so that it may be moved toward or away from the fixed jaw 11. A spring member 16 supported by pin 15 is used to urge the jaw 12 to open position as indicated by chain dotted outline 12a. A stop member in the form of a pin 17 limits the movement of the jaw 12 and determines the maximum open position.

To move the jaw 12 into closed position a cam member 18 is provided, handle 19 being attached to cam 18. Handle 19 is shaped to project through the side plates 13 so that it acts as a pivot for the handle and cam assembly. The cam 18 is securely attached to handle member 19 by suitable means such as brazing.

At the opposite end of the frame from the attaching jaws 12 the anchor and adjusting mechanism is supported. The anchor hook 9 is in the form of a flat plate member properly shaped to provide the terminal hook 20. The thickness of the hook 9 is selected to permit it to be supported between frame-plates 13. A slot 21 in the hook member 9 guides and supports it between the plate members 13 for anchoring purposes. Spacer members 22 fit in slot 21 and are held by bolts 23 which in turn pass through anchor plates 13 and split bushing elements 24. The split bushing parts 24—24 have a flat inside face for engaging the plates 13 and cylindrical external surfaces, the smaller diameter of which is in the central region at 25. A female threaded collar 26 is supported in the split bushing 24—24, the shoulders of the split bushing being arranged to prevent longitudinal displacement of the threaded collar 26. The diameter of the upper end 27 of the split bushing is proportioned so that it may be passed through the collar 26 before it is assembled in position on the plates 13. The internal threads of collar 26 engage the threaded edges 28 of the anchor hook 9 to allow longitudinal adjustment of the position of the anchor hook with respect to the frame plates 13. A suitable hand grip 30 is attached to the collar 25 by means of set screw 31 to permit easy turning of the mechanism for adjustment purposes.

In using the apparatus of the present invention for securing cargo, the chain member 5 is attached to the cargo in a suitable manner using the grab hook provided with the chain to engage the chain firmly in position. The anchor unit 6, with the hook member 9 moved to extended position, is then attached to an anchor lug or ring in the carrier vehicle. The chain is held by hand and adjusted so that the most convenient link may be engaged in the jaws. By moving the handle 19 from chain dotted position 19a to full line position 19 the jaw 12 is moved to closed position and the cam 18 is positioned with its flat end portion against the flat cam surface 12b of the jaw 12. In this position the cam is in over-dead-center relationship and any opening force on the jaw merely induces a compression load in the cam. Handle 19, in closed position, lies along the body of the tie down where it is protected from accidental displacement. The shape of the handle also contributes to its safety against inadvertent movement.

It will be noted that the jaws are arranged to engage a link 5a along its upper curved surface while the link lies in the plane of the jaws and one side of the link is retained in proper position by a pocket formed by the fixed jaw 11 and the side plates 13. The jaws are shaped to project through the next adjacent link 5b from the one that takes the load from the jaws and projections 32 at the end of the movable jaw prevent inserting the jaws in the link in an improper manner. Thus the engagement of the link is such that the full load of the chain may be transferred to the jaw with no danger of damage to the chain or the jaws. The pocket in which one side of the link may be placed helps line the link up in proper position for closing jaw 12 so that the engagement of the chain may be accomplished in a minimum amount of time. As will be seen most clearly in Figure 3 the first unloaded link 5c extends laterally beyond the jaws and allows the unused chain to hang in a position where it does not interfere with the operation of the tie down.

After engaging the link with the jaws, all slack may be removed by turning the hand grip 30 to screw the anchor hook 9 further into the body of the tie down. The position of the fully retracted anchor member is shown in the chain dotted outline at 9a.

The tie down may be quickly released even when under load to allow the cargo to be unloaded in a minimum amount of time. The release is accomplished by moving the release handle 19 to the release position 19a which forces the cam 18 away from its locked position and permits the jaw 12 to open and release the chain.

From the foregoing it will be clear that I have provided an improved tie down device particularly for use with a chain type tension member. With this equipment the process of attachment to the chain and tensioning may be accomplished within a minimum amount of time. Likewise, the load may be released easily and quickly by opening the chain engaging jaws. Thus the same mechanism is used for the engagement of the anchoring unit to the chain and also for the quick release of the tie down unit. Since all of the loads are transferred in direct fashion between the chain and the body of the anchoring member and the adjustable anchoring mechanism, a compact tie down device results having a minimum weight for a given capacity.

I claim:

1. Securing apparatus including a chain tension member, an adjusting and anchoring device including a frame having a pair of parallel plates spaced apart a distance slightly greater than the thickness of a chain link, a fixed chain engaging jaw having a thickness equal to the spacing of said plates, said jaw being rigidly fastened between said plates to support them at one end of the frame, a movable chain engaging jaw pivotally supported between said plates, length adjusting mechanism mounted at the other end of said frame, said mechanism including a flat link member having a thickness approximately equal to the space between said frame plates, said link having serrated edges, a threaded collar supported on said side plates with its thread engaging the serrations in said link, fastening members supporting said collar and spacers between said side plates held in position by said fastening members.

2. Securing apparatus including a chain tension member, an adjusting and anchoring device including a frame having a pair of parallel plates spaced apart a distance slightly greater than the thickness of a chain link, a fixed chain engaging jaw having a thickness equal to the spacing of said plates, said jaw being rigidly fastened between said plates to support them at one end of the frame, a movable chain engaging jaw pivotally supported between said plates, both the fixed and movable jaws having their inside surfaces formed to a generally elongated oval shape and having a width as great as the width of a chain link and having a length greater than the chain link, the side plates extending beyond at least a portion of the inside surface of the fixed jaw to form a link locating pocket, the tip of each of said jaws being reduced in cross section to fit in the open space within the adjacent chain link when the jaws are in closed position.

3. Securing apparatus including a chain tension member, an adjusting and anchoring device including a frame having a pair of parallel plates spaced apart a distance slightly greater than the thickness of a chain link, a fixed chain engaging jaw having a thickness equal to the spacing of said plates, said jaw being rigidly fastened between said plates to support them at one end of the frame, a movable chain engaging jaw pivotally supported between said plates, the fixed and movable jaws having their inside surfaces formed to a generally elongated oval shape to encompass the end and sides of a link, the tip of each of said jaws being reduced in cross section to fit in the open space within the adjacent chain link when the jaws are in closed position and the movable jaw having a projection at each side thereof adjacent the reducing tip of said movable jaw to prevent improper link engagement.

References Cited in the file of this patent

UNITED STATES PATENTS

| | | |
|---|---|---|
| 703,664 | Nilson | July 1, 1902 |
| 850,623 | Clark | Apr. 16, 1907 |
| 1,041,068 | Greenhalgh | Oct. 15, 1912 |
| 1,124,790 | Nedrow | Jan. 12, 1915 |
| 1,475,755 | Dies | Nov. 27, 1923 |
| 2,094,407 | Nampa | Sept. 29, 1937 |
| 2,538,757 | Bratthauer | Jan. 23, 1951 |
| 2,595,450 | Coffing | May 6, 1952 |